United States Patent
Lopez et al.

(10) Patent No.: US 9,940,138 B2
(45) Date of Patent: Apr. 10, 2018

(54) UTILIZATION OF REGISTER CHECKPOINTING MECHANISM WITH POINTER SWAPPING TO RESOLVE MULTITHREADING MIS-SPECULATIONS

(75) Inventors: Pedro Lopez, Molins de Rei (ES); Carlos Madriles, Barcelona (ES); Alejandro Martinez, Barcelona (ES); Raul Martinez, Barcelona (ES); Josep M. Codina, Hospitalet de Llobregat (ES); Enric Gibert Codina, Sant Cugat del Vallès (ES); Fernando Latorre, Barcelona (ES); Antonio Gonzalez, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 1444 days.

(21) Appl. No.: 12/420,762

(22) Filed: Apr. 8, 2009

(65) Prior Publication Data

US 2010/0262812 A1 Oct. 14, 2010

(51) Int. Cl.
*G06F 9/30* (2006.01)
*G06F 11/00* (2006.01)
(Continued)

(52) U.S. Cl.
CPC ........ *G06F 9/3863* (2013.01); *G06F 9/30043* (2013.01); *G06F 9/3842* (2013.01); *G06F 9/3851* (2013.01); *G06F 11/1402* (2013.01)

(58) Field of Classification Search
CPC .. G06F 9/30076; G06F 9/3842; G06F 9/3851; G06F 9/3861; G06F 9/3863;
(Continued)

(56) References Cited

U.S. PATENT DOCUMENTS

| 5,410,685 A | 4/1995 | Banda et al. |
| 7,168,076 B2 * | 1/2007 | Chaudhry et al. ............ 718/106 |

(Continued)

FOREIGN PATENT DOCUMENTS

| CN | 101154185 A | 4/2008 |
| JP | 2000-047887 A | 2/2000 |

(Continued)

OTHER PUBLICATIONS

Tuck et al., "Multithreaded Value Prediction", Feb. 2005, 11 pages.*
(Continued)

*Primary Examiner* — David J Huisman
(74) *Attorney, Agent, or Firm* — Alpine Technology Law Group LLC

(57) ABSTRACT

Methods and apparatus are disclosed for using a register checkpointing mechanism to resolve multithreading mis-speculations. Valid architectural state is recovered and execution is rolled back. Some embodiments include memory to store checkpoint data. Multiple thread units concurrently execute threads. They execute a checkpoint mask instruction to initialize memory to store active checkpoint data including register contents and a checkpoint mask indicating the validity of stored register contents. As register contents change, threads execute checkpoint write instructions to store register contents and update the checkpoint mask. Threads also execute a recovery function instruction to store a pointer to a checkpoint recovery function, and in response to mis-speculation among the threads, branch to the checkpoint recovery function. Threads then execute one or more checkpoint read instructions to copy data from a valid checkpoint storage area into the registers necessary to recover a valid architectural state, from which execution may resume.

20 Claims, 3 Drawing Sheets

(51) Int. Cl.
*G06F 9/38* (2018.01)
*G06F 11/14* (2006.01)

(58) Field of Classification Search
CPC ............. G06F 11/1405; G06F 11/1407; G06F 11/1412; G06F 9/30003; G06F 9/30043
USPC .............................. 712/220, 228; 714/15, 19
See application file for complete search history.

(56) References Cited

U.S. PATENT DOCUMENTS

| | | | |
|---|---|---|---|
| 7,191,292 B2* | 3/2007 | Chaudhry et al. | 711/133 |
| 7,243,262 B2* | 7/2007 | Mukherjee et al. | 714/15 |
| 7,308,607 B2* | 12/2007 | Reinhardt et al. | 714/25 |
| 7,409,589 B2* | 8/2008 | Mack et al. | 714/15 |
| 7,475,230 B2* | 1/2009 | Chou et al. | 712/228 |
| 7,523,465 B2 | 4/2009 | Aamodt et al. | |
| 7,584,346 B1* | 9/2009 | Chaudhry et al. | 712/228 |
| 7,610,470 B2* | 10/2009 | Chaudhry et al. | 712/220 |
| 7,610,474 B2* | 10/2009 | Caprioli et al. | 712/239 |
| 7,634,641 B2* | 12/2009 | Chaudhry et al. | 712/228 |
| 7,865,769 B2 | 1/2011 | Luick | |
| 8,413,162 B1* | 4/2013 | Rozas et al. | 718/108 |
| 8,909,902 B2 | 12/2014 | Latorre et al. | |
| 2003/0018826 A1 | 1/2003 | Chaudhry et al. | |
| 2004/0162948 A1 | 8/2004 | Tremblay et al. | |
| 2004/0230778 A1* | 11/2004 | Chou et al. | 712/228 |
| 2005/0223385 A1 | 10/2005 | Braun et al. | |
| 2007/0186081 A1* | 8/2007 | Chaudhry et al. | 712/214 |
| 2009/0172370 A1* | 7/2009 | Butler | 712/234 |
| 2009/0187906 A1* | 7/2009 | Caprioli et al. | 718/101 |
| 2010/0274972 A1 | 10/2010 | Babayan et al. | |
| 2016/0162406 A1 | 6/2016 | Latorre et al. | |

FOREIGN PATENT DOCUMENTS

| | | |
|---|---|---|
| JP | 2006-518077 A | 8/2006 |
| JP | 3139964 U | 3/2008 |
| JP | 2009-009570 A | 1/2009 |
| JP | 2009-508187 A | 2/2009 |
| WO | 2005/119461 A2 | 12/2005 |
| WO | 2007/015925 A1 | 2/2007 |

OTHER PUBLICATIONS

Colohan et al., "CMP Support for Large and Dependent Speculative Threads", Aug. 2007, pp. 1041-1054.*
Office Action Received for the European Patent Application No. 10250646.2, dated Aug. 20, 2010, 6 pages.
Office Action Received for the Japanese Patent Application No. 2010-1380729, dated Mar. 27, 2012, 16 pages of Office Action including 7 pages of English translation.
Office Action Received for Japanese Patent Application No. 2010-080729, dated Oct. 16, 2012, 4 pages of Office Action and 3 pages of English Translation.
Office Action Received for Chinese Patent Application No. 201010161083.4, dated Dec. 17, 2012, 16 pages of Office Action and 8 pages of English Translation.
Notice of Grant received for Japanese Patent Application No. 2010-080729, dated Mar. 5, 2013, 4 pages of grant only.
Office Action received for Chinese Patent Application No. 2010101610834, dated Jul. 15, 2013, 7 pages of English Translation and 14 pages of Office Action.
Rajwar et al., "Speculative Lock Elision: Enabling Highly Concurrent Multithreaded Execution", Appears in the proceedings of the 34th International Symposium on Microarchitecture (MICRO), Dec. 3-5, 2001, 12 pages.
Oplinger et al., "Software and Hardware for Exploiting Speculative Parallelism with a Multiprocessor", Computer Systems Laboratory, Stanford University, 1997, pp. 1-23.
Notice of Grant received for Chinese Patent Application No. 201010161083, dated May 16, 2014, 2 pages of English Translation and 2 pages of Chinese Notice of Grant.
Office Action received for Chinese Patent Application No. 201010161083.4, dated Jan. 6, 2014, 5 pages of English Translation and 13 pages of Chinese Office Action.
Balakrishnan, et al., "Program Demultiplexing: Data-flow based Speculative Parallelization of Methods in Sequential Programs", Symposium, 2006, 12 pages, Proc. of International Symposium on Computer Architecture.
Du, et al., "A Cost-Friven Compilation Framework for Speculative Parallelization of Sequential Programs", Jun. 2004, 11 pages, Washington DC.
Quinones, et al., "Mitosis Compiler: An Infrastructure for Speculative Threading Based on Pre-Computation Slices", Conference, Jun. 2005, 11 pages, Conference on Programming Language Design and Implementation, Chicago, IL.

* cited by examiner

UTILIZATION OF REGISTER CHECKPOINTING MECHANISM WITH POINTER SWAPPING TO RESOLVE MULTITHREADING MIS-SPECULATIONS

FIELD OF THE DISCLOSURE

This disclosure relates generally to the field of information processing systems. In particular, the disclosure relates to a register checkpointing mechanism for speculative multithreading.

BACKGROUND OF THE DISCLOSURE

In order to increase performance of information processing systems, such as those that include microprocessors, both hardware and software techniques have been employed. One approach that has been employed to improve processor performance is known as "multithreading." In multithreading, an instruction stream is split into multiple instruction streams that can be executed in parallel. In software-only multithreading approaches, such as time-multiplex multithreading or switch-on-event multithreading, the multiple instruction streams are alternatively executed on the same shared processor.

Increasingly, multithreading is supported in hardware. For instance, in one approach, processors in a multi-processor system, such as a chip multiprocessor (CMP) system, may each act on one of the multiple threads simultaneously. In another approach, referred to as simultaneous multithreading (SMT), a single physical processor is made to appear as multiple logical processors to operating systems and user programs. That is, each logical processor maintains a complete set of the architecture state, but nearly all other resources of the physical processor, such as caches, execution units, branch predictors control logic and buses are shared. The threads execute simultaneously and make better use of shared resources than time-multiplex multithreading or switch-on-event multithreading.

For those systems, such as CMP and SMT multithreading systems, that provide hardware support for multiple threads, one or more threads may be idle during execution of a single-threaded application. Utilizing otherwise idle threads to speculatively parallelize the single-threaded application can increase speed of execution, but it is often-times difficult to determine which sections of the single-threaded application should be speculatively executed by the otherwise idle thread. Speculative threads are not always guaranteed to be independent. Inter-thread dependencies may arise at runtime resulting in mis-speculations and will simply cause the speculation to fail. In resolving mis-speculations, a correct architectural state may need to be recovered.

To date, efficient mechanisms for resolving such mis-speculations in speculative multithreading systems have not been fully explored.

BRIEF DESCRIPTION OF THE DRAWINGS

The present invention is illustrated by way of example and not limitation in the figures of the accompanying drawings.

DETAILED DESCRIPTION

Figure 1:
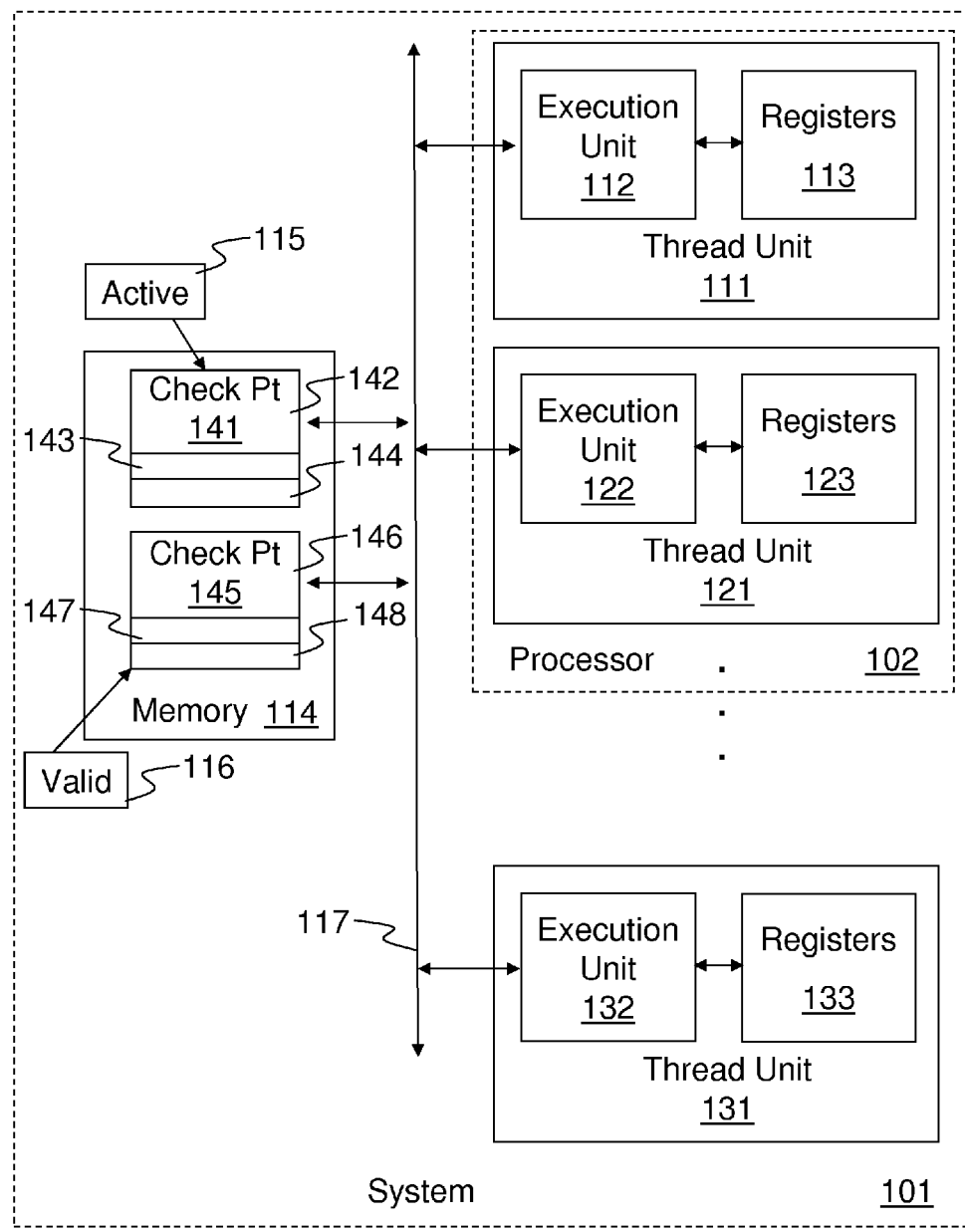
FIG. 1 illustrates one embodiment of a multithreaded processing system using a register checkpointing mechanism for speculative multithreading.

Methods and apparatus in a multithreaded processing system are disclosed for using a register checkpointing mechanism to support speculative multithreading. Whenever inter-thread dependencies arise at runtime, they may result in mis-speculations. Resolving a mis-speculation may require that a correct architectural state be recovered and execution be rolled back to a safe point. Some embodiments of the present invention include memory having storage areas to store checkpoint data for mis-speculation recovery among a plurality of threads. Multiple thread units concurrently execute threads. The thread units can execute a checkpoint mask instruction to initialize a storage area to store active checkpoint data including register contents and a checkpoint mask indicative of the validity of the stored register contents. As register contents change, thread units can execute checkpoint write instructions to store register contents for the active checkpoint and update the checkpoint mask. The thread units can also execute a recovery function instruction to store an instruction pointer for a checkpoint recovery function for the active checkpoint, and in response to a mis-speculation among the threads, branch to the checkpoint recovery function. The thread units then execute one or more checkpoint read instructions to copy data from a valid checkpoint storage area into the necessary registers to recover a correct architectural state, from which execution may resume.

Thus, such a register checkpointing mechanism may provide for a recoverable valid architectural state without requiring inter-thread synchronization. Thread units asynchronously execute threads and thereby seamlessly work together to merge and build the architectural state. It will be appreciated that embodiments of the present invention allow for fine-grain speculative multithreading. For the purpose of clarity in the discussion below we address maintaining a recoverable valid architectural state in the context of mis-peculation, but it will be appreciated that recovery may be facilitated in substantially the same way in the event of any number of unexpected disruptions such as interrupts, exceptions, context switches, etc. Also for the purpose of clarity in the discussion below, we assume that instructions commit or become globally visible in sequential order.

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than a restrictive sense and the invention measured only in terms of the claims and their equivalents.

As it has been noted, speculative threads are not always guaranteed to be independent. A number of techniques may be used to detect and to resolve inter-thread dependencies statically or at runtime. Such techniques may be software based or hardware based or a combination of the two. Hardware based cache coherence infrastructures, for example may be used to detect and/or to resolve inter-thread dependencies through renaming for name dependencies and/or forwarding for true dependencies at runtime.

In software, name dependence resolution that relies on a compiler's ability to privatize data statically can be performed. Then other dependencies may be detected at runtime and will simply cause the speculation to fail. Dynamic renaming can also be used to resolve name dependencies in software but requires a restoration phase after the speculative execution. True data dependencies may be resolved through broadcasting addresses of shared data and enforcing synchronization between threads on those addresses with the associated overhead. A lazy forwarding technique may also be used for true data dependencies to reduce the synchronization overhead. Speculative loads and stores may also be augmented in software with checking code and data structures to detect mis-speculations.

Whenever inter-thread dependencies arise at runtime, they may result in mis-speculations. Regardless of the mechanism for detecting a mis-speculation, resolving it may require that a correct architectural state be recovered and execution be rolled back to a safe point. The techniques herein disclosed are directed at maintaining architectural state checkpoints and rolling back execution to safe execution points corresponding to those checkpoints independent of the other mechanisms that may be used for dependence resolution and detecting mis-speculation.

FIG. 1 illustrates one embodiment of a multithreaded processing system 101 using a register checkpointing mechanism for speculative multithreading. Embodiments of system 101 may include memory 114 having storage areas to store checkpoint data 141 and checkpoint data 145 for mis-speculation recovery among a plurality of speculative threads. Multiple thread units 111, 121, 131 are coupled with memory 114 via a bus or any other interconnect 117 and thread units 111, 121, 131 concurrently execute their respective threads. Some embodiments of system 101 may also include processors such as processor 102, which has multiple thread units 111 and 121. It will be appreciated that storage areas to store checkpoint data 141 and checkpoint data 145 may be allocated in memory 114 by a compiler or by an operating system, or memory 114 may be hidden or aliased state in hardware.

As register 113-133 contents change, thread units 111-131 can execute checkpoint write instructions through respective execution units 112-132 to store their respective register 113-133 contents for the active checkpoint 141 and update the checkpoint mask for the corresponding register that was stored. For some embodiments the checkpoint mask is updated until all register contents of interest have been stored, at which time the active checkpoint becomes the most recent valid checkpoint and a new active checkpoint may be initialized by executing another checkpoint mask instruction. For some embodiments the active checkpoint may become the most recent valid checkpoint by copying the checkpoint data responsive to the first successful checkpoint mask instruction when the active checkpoint mask is completely valid. For alternative embodiments pointers 115 and 116 may be swapped.

The thread units 111, 121, 131 can also execute a recovery function instruction through respective execution units 112, 122, 132 to store an instruction pointer for a checkpoint recovery function in a storage location 142 for the active checkpoint data 141. For some embodiments, each speculative thread may store a distinct instruction pointer for a distinct checkpoint recovery function in the storage location 142 for the active checkpoint data 141. In response to a mis-speculation among speculative threads of any of thread units 111, 121, 131, those thread units 111, 121, 131 may branch to the checkpoint recovery function. The thread units 111, 121, 131 can then execute one or more checkpoint read instructions through respective execution units 112, 122, 132 to copy data from a valid checkpoint data 145 storage area 146 into the necessary respective registers 113, 123, 133 to recover a correct architectural state, from which execution may resume.

For one embodiment of instructions to support the register checkpointing mechanism for speculative multithreading, a description is given in Table 1.

TABLE 1

Checkpointing Instruction Descriptions.

| Instruction | Scope | Description |
| --- | --- | --- |
| CP_MASK register_mask | Global | Initialize an active checkpoint by setting the register checkpoint mask to register_mask. Optionally copy the committed checkpoint information into the active checkpoint. |
| RECOVERY_FUNC ip | Thread | Specify the instruction pointer (ip) for the recovery routine for the executing thread in the active checkpoint. |
| CP_WRITE reg, address | Global | Store the contents of an architectural register to an address in the active checkpoint storage and set the corresponding checkpoint mask to valid. |
| CP_READ reg, address | Thread | Load the stored register contents from the address in the valid checkpoint storage into an architectural register. |

The thread units 111-131 can execute a checkpoint mask instruction through their respective execution units 112-132 to initialize a storage area to store active checkpoint 141 data including a plurality of storage locations 143-144 to store register 113-133 contents and a checkpoint mask indicative of the validity of the stored register 113-133 contents. It will be appreciated that in some embodiments one or more of execution units 112-132 may be physically shared by some of thread units 111-131. In some embodiments, two storage areas are managed, one to store active checkpoint 141 data and one to store the most recent valid checkpoint 145 data.

It will be appreciated that various alternative embodiments of the checkpointing instructions shown in Table 1 may be made or used without departing from the principles of the present invention. For example, the checkpoint masks may not need to be explicitly set by a checkpoint mask instruction, but rather a register count could be provided as an argument.

Figure 2:
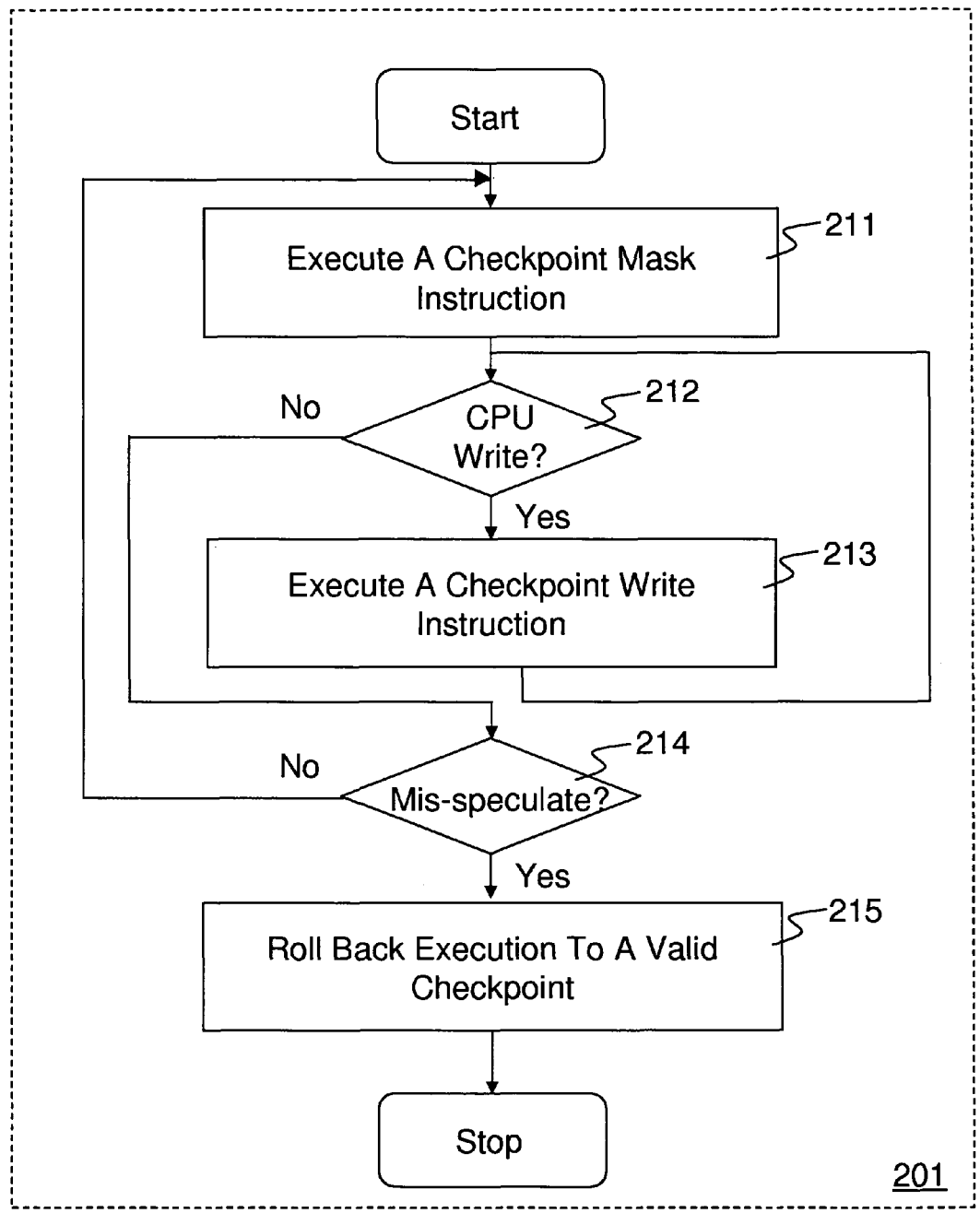
FIG. 2 illustrates a flow diagram for one embodiment of a process to use a register checkpointing mechanism for speculative multithreading.

FIG. 2 illustrates a flow diagram for one embodiment of a process 201 to use a register checkpointing mechanism for speculative multithreading. Process 201 and other processes herein disclosed are performed by processing blocks that may comprise dedicated hardware or software or firmware operation codes executable by general purpose machines or by special purpose machines or by a combination of both. Processing blocks of process 201 and other processes herein disclosed may also be executed concurrently or in parallel or sequentially or out of order by one or more thread units.

In processing block 211, a checkpoint mask instruction is executed to initialize a memory storage area for an active checkpoint data 141 to store at least a first data 143 and a second data 144. In processing block 212, when a central processing unit (CPU) write occurs, e.g., in the case that a critical registers contents may have changed, processing proceeds to processing block 213 where a checkpoint write instruction is executed to store the first data 143 corresponding to the changed register's contents, and to store the second data 144 having a state indicative of the validity status of the changed register's contents for the checkpoint write instruction. Otherwise processing proceeds to processing block 214, where if a mis-speculation or other event requiring a roll back is detected, processing proceeds to processing block 215 and execution is rolled back to the most recent valid checkpoint data 145. If no mis-speculation or other such event is detected processing proceeds normally from processing block 214 to processing block 211 and a new active checkpoint is initialized.

For some embodiments of process 201 the checkpoint mask instruction, the checkpoint write instructions and the recovery code for rolling back execution to the most recent valid checkpoint are all inserted statically into a thread by a compiler. For some alternative embodiments of process 201 the checkpoint mask instruction, the checkpoint write instructions and the recovery code for rolling back execution to the most recent valid checkpoint may be inserted dynamically into a thread by a dynamic optimizer or through microcode or by a dynamic hardware mechanism.

Figure 3:
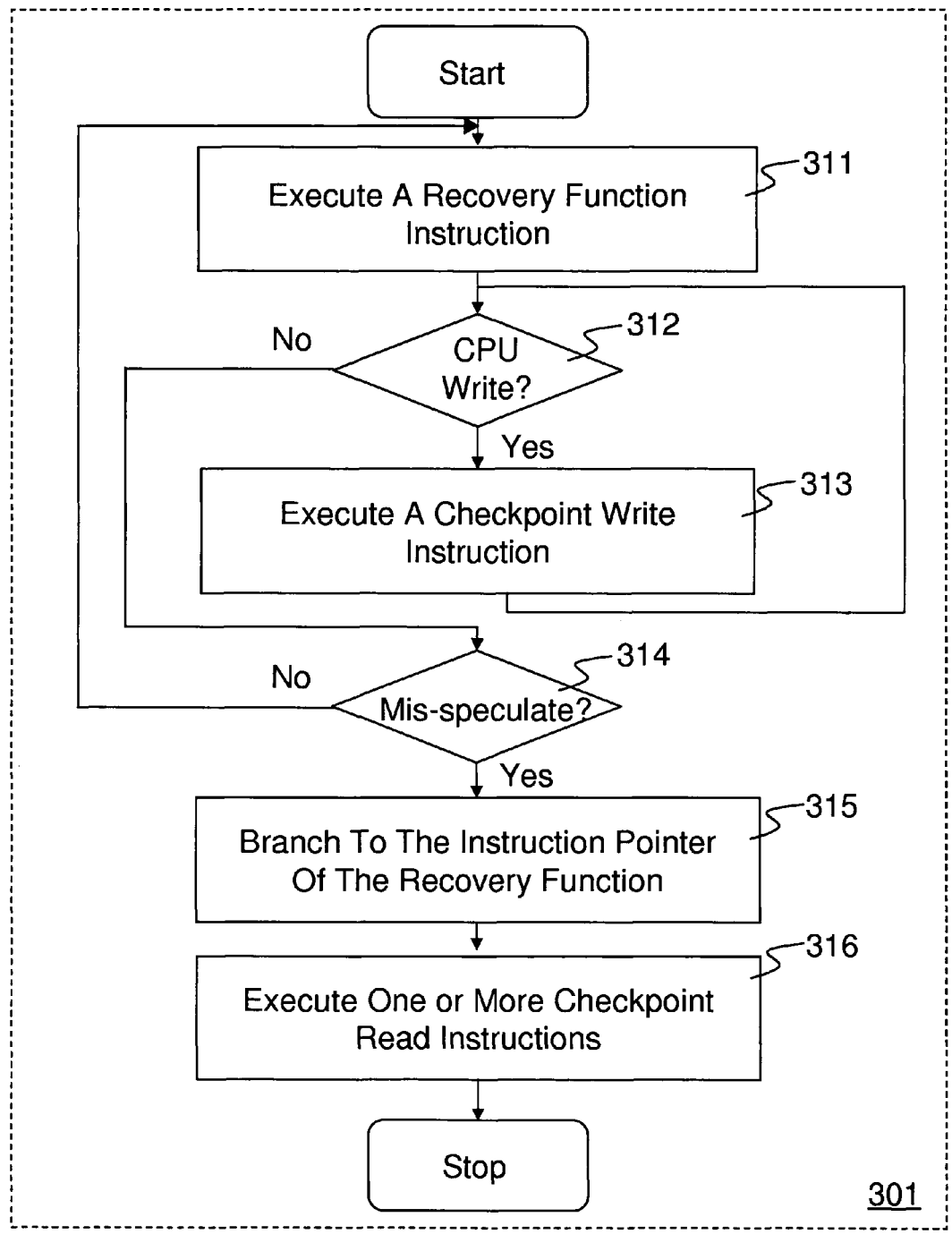
FIG. 3 illustrates a flow diagram for an alternative embodiment of a process to use a register checkpointing mechanism for speculative multithreading.

FIG. 3 illustrates a flow diagram for an alternative embodiment of a process 301 to use a register checkpointing mechanism for speculative multithreading.

In processing block 311, a recovery function instruction is executed to store, in a memory storage area for an active checkpoint data 141, a first data 142 comprising an instruction pointer for a checkpoint recovery function. In processing block 312, when a CPU write occurs, e.g., in the case that a critical register's contents may have changed, processing proceeds to processing block 313 where a checkpoint write instruction is executed to store a second data 143 corresponding to the changed register's contents, and to store a third data 144 having a state indicative of the validity status of the changed register's contents for the checkpoint write instruction. Otherwise processing proceeds to processing block 314, where if a mis-speculation or other such event is detected, processing proceeds to processing block 315 and a branch to a location specified by the instruction pointer for said checkpoint recovery function is taken in response to the mis-speculation. Then in processing block 316, one or more checkpoint read instructions are executed to copy the stored data 147 or 148 from said memory storage area for the most recent valid checkpoint data 145 into the necessary respective registers. If no mis-speculation or other such event is detected processing block 314, processing may proceeds normally to processing block 311 and a new active checkpoint is built.

It will be appreciated that in some embodiments of process 301 the recovery function instruction, the checkpoint write instructions and the one or more checkpoint read instructions may be inserted statically into a thread by a compiler or may be inserted dynamically into a thread by a dynamic optimizer or by any other suitable method.

The above description is intended to illustrate preferred embodiments of the present invention. From the discussion above it should also be apparent that especially in such an area of technology, where growth is fast and further advancements are not easily foreseen, the invention may be modified in arrangement and detail by those skilled in the art without departing from the principles of the present invention within the scope of the accompanying claims and their equivalents.

What is claimed is:

1. An apparatus, comprising:
a plurality of thread unit circuits to concurrently execute a plurality of threads, each of the plurality of thread unit circuits being capable of executing a checkpoint write instruction to update data stored in a memory storage area after execution of a checkpoint mask instruction; and
the memory storage area comprising an active checkpoint storage area and a most recent valid checkpoint storage area, wherein the active checkpoint storage area is to store, in response to the checkpoint write instruction, first data for the checkpoint write instruction encountered during execution of one of the plurality of threads, the first data corresponding to register content data being written by the checkpoint write instruction;
wherein the active checkpoint storage area is also to store second data for the checkpoint write instruction, the second data having a state indicative of a validity status of the register content data for the checkpoint write instruction, wherein an active checkpoint pointer, which points to the active checkpoint storage area, is to become a most recent valid checkpoint pointer, which points to the most recent valid checkpoint storage area, in response to a determination that all register contents corresponding to execution of multiple instances of the checkpoint write instruction by any of the plurality of thread unit circuits have been updated and all register contents corresponding to execution of the multiple instances of the checkpoint write instruction are indicated as completely valid by a checkpoint mask stored in the active checkpoint storage area.

2. The apparatus of claim 1, wherein each of the plurality of thread unit circuits is further capable of executing the checkpoint mask instruction to initialize the state of said second data.

3. The apparatus of claim 2, wherein executing the checkpoint mask instruction initializes the state of said second data for an active checkpoint.

4. The apparatus of claim 1, wherein each of the plurality of thread unit circuits is further capable of executing a checkpoint read instruction to copy the first data from said memory storage area into a register.

5. The apparatus of claim 1, wherein the memory storage area is also to store third data for a checkpoint recovery function.

6. The apparatus of claim 5, wherein said third data corresponds to an instruction pointer for said checkpoint recovery function responsive to a recovery function instruction encountered during execution of said one of the plurality of threads.

7. A multi-threaded processor, comprising:
a plurality of thread unit circuits to concurrently execute a plurality of threads, each of the plurality of thread unit circuits being capable of executing a checkpoint write instruction to update data stored in a memory storage area after execution of a checkpoint mask instruction and each of the plurality of thread unit circuits being further capable of executing the checkpoint mask instruction; and an execution unit of one of the plurality of thread unit circuits, responsive to the checkpoint mask instruction, to initialize the memory storage area comprising an active checkpoint storage area and a most recent valid checkpoint storage area, wherein the active checkpoint storage area is to store, in response to the checkpoint write instruction, at least first data and second data;

wherein said execution unit, responsive to the checkpoint write instruction, is to store the first data corresponding to register content data being written by the checkpoint write instruction, and store the second data having a state indicative of a validity status of the register content data for the checkpoint write instruction, and wherein an active checkpoint pointer, which points to the active checkpoint storage area, is to become a most recent valid checkpoint pointer, which points to the most recent valid checkpoint storage area, in response to a determination that all register contents corresponding to execution of multiple instances of the checkpoint write instruction by any of the plurality of thread unit circuits have been updated and all register contents corresponding to execution of the multiple instances of the checkpoint write instruction are indicated as completely valid by a checkpoint mask stored in the active checkpoint storage area.

8. The processor of claim 7, wherein each of the plurality of thread unit circuits is further capable of executing a checkpoint read instruction to copy the first data from said memory storage area into a register.

9. The processor of claim 8, wherein each of the plurality of thread unit circuits is further capable of executing a recovery function instruction to store, in said memory storage area, third data comprising an instruction pointer for a checkpoint recovery function.

10. A machine-implemented method for speculatively executing a plurality of threads, the method comprising:

executing a checkpoint mask instruction to initialize a memory storage area comprising an active checkpoint storage area and a most recent valid checkpoint storage area, wherein the active checkpoint storage area is to store at least first data and second data in response to a checkpoint write instruction capable of updating data stored in the memory storage area; and executing the checkpoint write instruction to store the first data corresponding to register content data being written by the checkpoint write instruction and to store the second data having a state indicative of a validity status of the register content data for the checkpoint write instruction, wherein an active checkpoint pointer, which points to the active checkpoint storage area, is to become a most recent valid checkpoint pointer, which points to the most recent valid checkpoint storage area, in response to a determination that all register contents corresponding to execution of multiple instances of the checkpoint write instruction by any of a plurality of thread unit circuits have been updated and all register contents corresponding to execution of the multiple instances of the checkpoint write instruction are indicated as completely valid by a checkpoint mask stored in the active checkpoint storage area.

11. The method of claim 10, further comprising:
executing a recovery function instruction to store, in said memory storage area, third data comprising an instruction pointer for a checkpoint recovery function.

12. The method of claim 11, further comprising:
executing a checkpoint read instruction to copy the first data from said memory storage area into a register.

13. The method of claim 12, wherein executing said checkpoint read instruction is a result of branching to a location specified by the instruction pointer for said checkpoint recovery function in response to a mis-speculation among the plurality of threads.

14. A machine-implemented method for mis-speculation recovery among a plurality of threads, the method comprising:

executing a recovery function instruction to store, in a memory storage area comprising an active checkpoint storage area and a most recent valid checkpoint storage area, prior to a checkpoint write instruction capable of updating data stored in the memory storage area after execution of a checkpoint mask instruction, first data comprising an instruction pointer for a checkpoint recovery function;

branching to a location specified by the instruction pointer for said checkpoint recovery function in response to a mis-speculation among the plurality of threads; and executing a checkpoint read instruction to copy second data from said memory storage area into a register, wherein an active checkpoint pointer, which points to the active checkpoint storage area, is to become a most recent valid checkpoint pointer, which points to the most recent valid checkpoint storage area, in response to a determination that all register contents corresponding to execution of multiple instances of the checkpoint write instruction by any of a plurality of thread unit circuits have been updated and all register contents corresponding to execution of the multiple instances of the checkpoint write instruction are indicated as completely valid by a checkpoint mask stored in the active checkpoint storage area.

15. The method of claim 14, further comprising:
executing the checkpoint mask instruction, to initialize the memory storage area for a new checkpoint to store at least the first data, the second data, and third data; and executing a first instance of the checkpoint write instruction, to store the second data corresponding to the register content data being written by the first instance of the checkpoint write instruction, and to store the third data having a state indicative of a validity status of the register content data for the first instance of the checkpoint write instruction.

16. A multi-threaded processing system comprising:
memory having a memory storage area to store data for mis-speculation recovery among a plurality of threads;

a plurality of thread unit circuits to concurrently execute said plurality of threads, each of the plurality of thread unit circuits being capable of executing a checkpoint write instruction to update data stored in the memory storage area after execution of a checkpoint mask instruction and each of the plurality of thread unit circuits being further capable of executing the checkpoint mask instruction; and an execution unit of one of the plurality of thread unit circuits, responsive to the checkpoint mask instruction, to initialize the memory storage area comprising an active checkpoint storage area and a most recent valid checkpoint storage area, wherein the active checkpoint storage area is to store, in response to the checkpoint write instruction, at least first data and second data;

wherein said execution unit, responsive to the checkpoint write instruction, is to store the first data corresponding to register content data being written by the checkpoint write instruction and store the second data having a state indicative of a validity status of the register content data for the checkpoint write instruction, and wherein an active checkpoint pointer, which points to the active checkpoint storage area, is to become a most recent valid checkpoint pointer, which points to the most recent valid checkpoint storage area, in response to a determination that all register contents corresponding to execution of multiple instances of the checkpoint write instruction by any of the plurality of thread unit circuits have been updated and all register contents corresponding to execution of the multiple instances of the checkpoint write instruction are indicated as completely valid by a checkpoint mask stored in the active checkpoint storage area.

17. The system of claim 16, wherein each of the plurality of thread unit circuits is further capable of executing a checkpoint read instruction to copy the first data from said memory storage area into a register.

18. The system of claim 17, wherein each of the plurality of thread unit circuits nits is further capable of executing a recovery function instruction to store, in said memory storage area, third data comprising an instruction pointer for a checkpoint recovery function.

19. A multi-threaded processing system comprising:
memory having a memory storage area to store data for mis-speculation recovery among a plurality of threads;
a plurality of thread unit circuits to concurrently execute said plurality of threads, each of the plurality of thread unit circuits being capable of executing a recovery function instruction and being further capable of executing a checkpoint read instruction; and
an execution unit of one of the plurality of thread unit circuits, responsive to the recovery function instruction, to store first data in the memory storage area, the memory storage area comprising an active checkpoint storage area and a most recent valid checkpoint storage area, wherein the active checkpoint storage area is to store the first data prior to a checkpoint write instruction capable of updating data stored in the memory storage area after execution of a checkpoint mask instruction, wherein the first data is to comprise an instruction pointer for a checkpoint recovery function;
wherein said one of the plurality of thread unit circuits, in response to a mis-speculation among the plurality of threads, is to branch to a location specified by the instruction pointer for said checkpoint recovery function; and
wherein said execution unit, responsive to the checkpoint read instruction, is to copy second data from said memory storage area into a register, wherein an active checkpoint pointer, which points to the active checkpoint storage area, is to become a most recent valid checkpoint pointer, which points to the most recent valid checkpoint storage area, in response to a determination that all register contents corresponding to execution of multiple instances of the checkpoint write instruction by any of the plurality of thread unit circuits have been updated and all register contents corresponding to execution of the multiple instances of the checkpoint write instruction are indicated as completely valid by a checkpoint mask stored in the active checkpoint storage area.

20. The system of claim 19, wherein:
responsive to the checkpoint mask instruction, said one of the plurality of thread unit circuits is to initialize the memory storage area for a new checkpoint to store at least the first data, the second data, and third data; and
responsive to a first instance of the checkpoint write instruction, said one of the plurality of thread unit circuits is to store the second data corresponding to register content data being written by a first instance of the checkpoint write instruction, and store the third data having a state indicative of a validity status of the register content data for a first instance of the checkpoint write instruction.

* * * * *